United States Patent [19]

Roberts

[11] Patent Number: 5,325,081
[45] Date of Patent: Jun. 28, 1994

[54] SUPPORTED STRAIN GAUGE AND JOY STICK ASSEMBLY AND METHOD OF MAKING

[75] Inventor: Joseph A. Roberts, Grafton, N.H.
[73] Assignee: Miraco, Inc., Nashua, N.H.
[21] Appl. No.: 76,545
[22] Filed: Jun. 14, 1993
[51] Int. Cl.$^5$ .......................... G01L 1/22; H01C 10/16
[52] U.S. Cl. ............................................ 338/2; 338/5; 338/128; 29/621.1
[58] Field of Search .................... 338/2, 5, 128, 47, 36; 29/621.1

[56] References Cited

U.S. PATENT DOCUMENTS 4,050,049 9/1977 Youmans ............................ 338/5 X
4,217,569 8/1980 Nejedly et al. .......................... 338/2

Primary Examiner—Marvin M. Lateef
Attorney, Agent, or Firm—Davis, Bujold & Streck

[57] ABSTRACT

A self terminating supported printed circuit strain gauge structure has a printed circuit including at least one strain gauge, interconnecting circuitry interconnecting the strain gauge to a connector circuit arrangement of a connector for connecting the circuit to a PC board. The entire circuit including the strain gauge, the interconnecting circuitry and the connector arrangement is formed on a single contiguous flexible dielectric substrate. The interconnecting circuitry and the connector elements are formed of a highly conductive material at least partially overplated onto the strain gauge printed circuit. A resilient support layer is laminated to the surface of the base substrate opposite the circuit to form a spring support structure for reinforcing and supporting the strain gauge circuit. The spring supported strain gauge printed circuit structure may have three or more strain gauges and be designed for incorporation in a joy stick strain gauge assembly for sensing the magnitude and direction of force applied to the joy stick by a user and such an assembly. The method of construction is also part of the invention, as are integrated connector features.

20 Claims, 3 Drawing Sheets

SUPPORTED STRAIN GAUGE AND JOY STICK ASSEMBLY AND METHOD OF MAKING

FIELD OF THE INVENTION

The present invention relates to spring supported self terminating strain gauge assemblies, in particular, a strain gauge assembly for use in combination with a joy stick to measure the force and the direction of the force placed upon the joy stick by a user.

BACKGROUND OF THE INVENTION

In joy stick assemblies, strain gauges are used to measure the force and the direction of the force applied to the joy stick by the user. Such prior art joy stick assemblies utilize a joy stick support structure that is deflected or strained by the joy stick. Individual strain gauges are laboriously adhered to the sides of the joy stick support structure to measure the deflection of the support structure, and electrical leads are tediously soldered to the contacts of the strain gauges. Due to the minute size of the strain gauges, it is very difficult and expensive to accurately adhere the strain gauges to the support structure. Likewise, it is very difficult to solder the electrical leads to the tiny contacts on the strain gauges.

As well as being very labor intensive and therefore expensive, the laborious and tedious assembly required in the prior art strain gauge joy stick assemblies greatly increases the probability of defects in the assembly that destroy the accuracy of the measurements, or even render the device inoperative. Also, since the electrical leads are soldered to the strain gauges, the assembly is not readily removable for repair or replacement.

The present invention provides a printed circuit strain gauge structure and a joy stick strain gauge assembly that can be readily and releasably connected with closely packed circuit terminals on a printed circuit board or directly to a printed circuit board.

A further objective of the invention is to provide a joy stick and strain gauge assembly that is relatively easy and inexpensive to manufacture.

Another object of the invention is to provide a joy stick and strain gauge assembly having improved reliability and enhanced performance.

SUMMARY OF THE INVENTION

According to the invention there is provided a self-terminating printed circuit structure comprising a) a flexible dielectric substrate having opposed first and second major surfaces; b) a strain gauge forming circuit pattern disposed on the first major surface; c) electrically conductive circuit elements forming circuit patterns disposed on the first major surface overlying at least portions of the strain gauge circuit patterns in electrically conductive continuity therewith; and d) a connector circuit means disposed on the first major surface integral with the circuit elements for terminating the structure at an electrical connector.

Also according to the invention there is provide a method of making a printed circuit structure, for use in a joy stick device having a flexible dielectric substrate having opposed first and second major surface; at least three strain gauge forming circuit patterns disposed on the first major surface; electrically conductive circuit elements disposed on the first major surface overlying portions of the strain gauge forming circuit patterns in electrically conductive continuity therewith; a connector circuit means disposed on the first major surface integral with the circuit elements for terminating the structure at an electrical connector; and a resilient support means fast with the second major surface at least coextensive with each circuit pattern; comprising the steps of:

a) providing a laminate of the flexible substrate and the resilient support means;

b) forming the circuit patterns on the first major surface, c) forming the circuit elements and circuit means including overplating to form the overlying portions; and d) removing unwanted portions of the resilient support means to produce said structure.

BRIEF DESCRIPTION OF THE DRAWINGS

The invention will hereinafter be described, by way of example, with reference to the accompanying drawings in which.

DETAILED DESCRIPTION OF THE INVENTION

Figure 1:
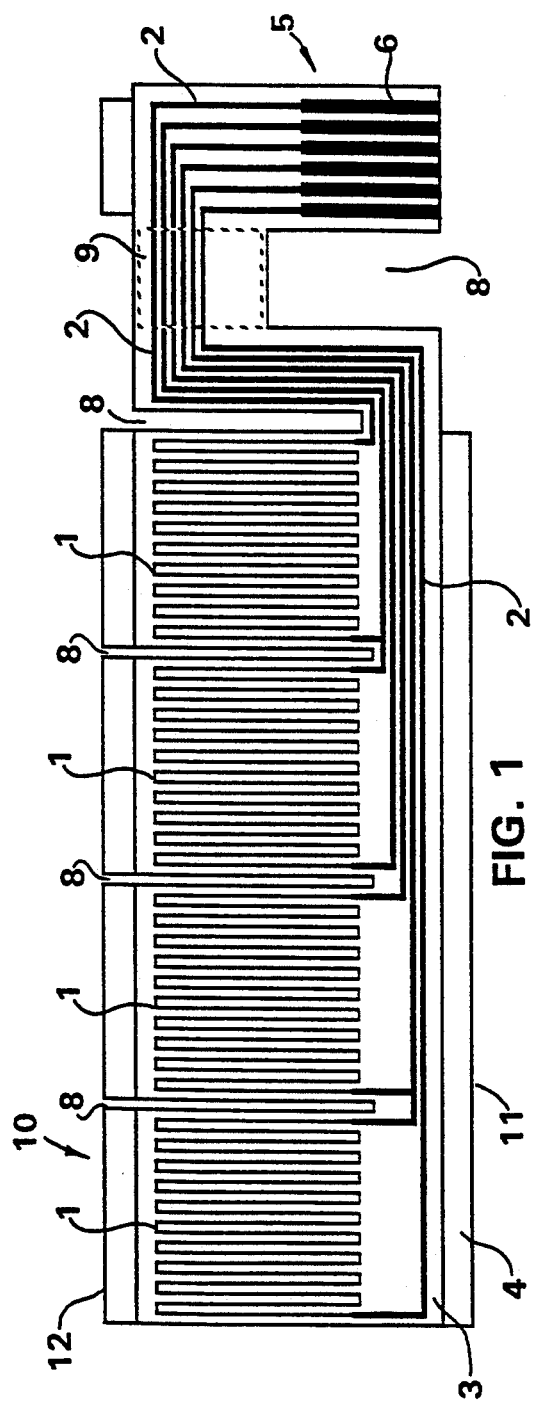
FIG. 1 is a front view of the supported, printed strain gauge structure with connector circuitry of the present invention.
Figure 2:
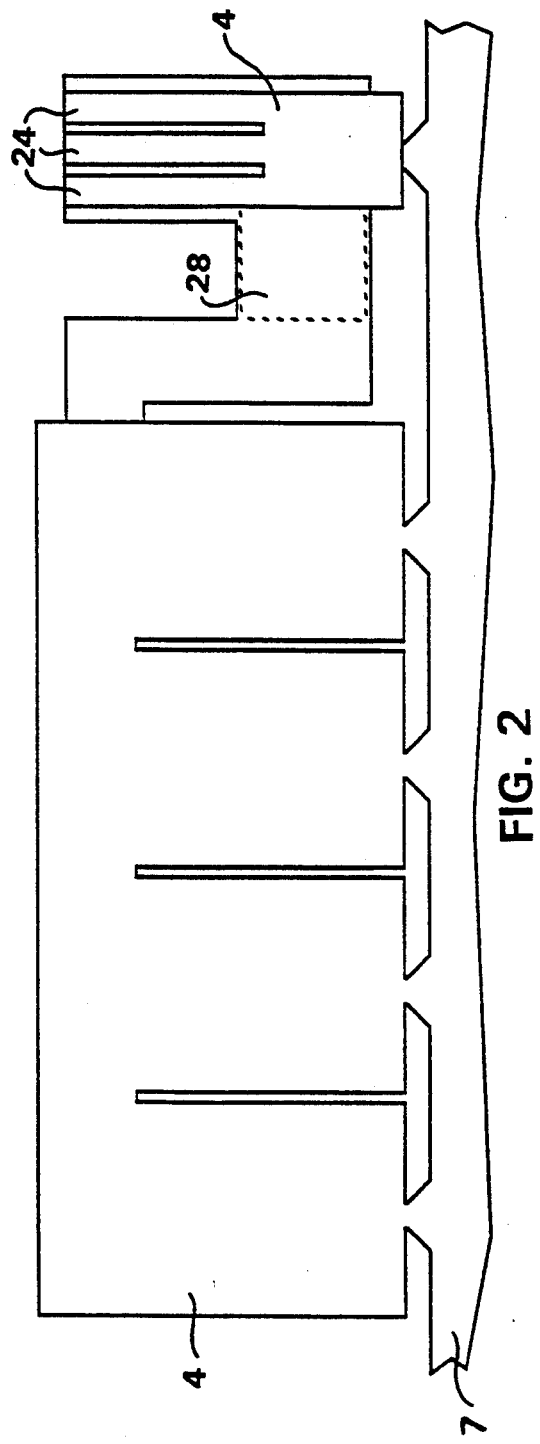
FIG. 2 is a rear view of the structure of FIG. 1.

Referring to FIGS. 1 and 2, self terminating strain gauges 1 with interconnecting circuit elements 2, and connector circuit means, generally indicated as 5, are formed as one homogenous printed circuit 10 on a single homogenous dielectric substrate 3. The substrate 3 is formed of any material suitable for use as a dielectric substrate (e.g. Polyimide). The homogenous circuit, consisting of the strain gauges 1, the interconnecting circuitry 2 and the connector elements 5, is initially formed by the deposition of a material having a resistance that varies with strain and is thus suitable for use as a strain gauge (e.g. Constantan). The homogenous circuitry is formed on the base substrate 3 by conventional imaging, deposition and etching operations. It will be appreciated that the homogeneous circuit may, alternatively, be formed by providing a Constantan-dielectric laminate, and etching away the unwanted portions of Constantan.

The portions of the homogenous circuitry that are desirably highly conductive (e.g. the interconnecting circuitry 2, the connector circuit elements 5 and contacts 6 in the connector element) are produced by overplating the initially formed homogeneous circuit with a highly conductive material (e.g. copper), while leaving the strain gauges unplated. In this way, the isolation of each strain gauge is improved and the systems overall sensitivity is improved. This technique also ensures that as the circuit is deformed, as hereinafter described, there is no appreciable resistance change in the interconnecting circuitry 2 and the accuracy of the circuitry is maintained.

While the Constantan preferably underlies the entire circuit, it will be appreciated that only the strain gauges may be made out of a material, such as Constantan, that is suitable for use as a strain gauge. The interconnecting circuitry 2 and the connector circuit elements 5, may then be formed of a highly conductive material such that the interconnecting circuitry overlaps contact portions of the strain gauges and is, therefore, in intimate electrical contact with the strain gauges.

To ease manufacture, ensure proper strain gauge alignment and provide structural integrity, a spring support structure 4 is incorporated into the structure 10. The spring support structure 4 is formed of a material (e.g. beryllium copper) that offers the desired mechanical characteristics, (e.g. the desired resilience and stability etc.). The support structure 4 is laminated to the surface of the base substrate 3 opposite the surface containing the strain gauges and the circuitry. With this construction, the support structure 4 supports the strain gauges 1 and the base substrate 3 with known resilient deflection characteristics and eliminates the possibility of voids or other molding inconsistencies that may adversely affect the intended function of the strain gauges.

It will be appreciated that by laminating the relatively stiff support structure 4 to the relatively thin and difficult to handle base layer 3, before forming the strain gauges and connecting circuitry, the imaging and etching operations are greatly simplified and yield is dramatically improved. In this way, the support structure stabilizes and reinforces the thin, delicate dielectric base layer, and provides a strong, tough support during processing. Cracking and chipping of the base layer 3 is therefore substantially avoided. A stabilizer 7, shown in FIG. 2, may be attached to, or formed as an extension of the support structure 4 to aid in the handling of the assembly during manufacture.

Figure 4:
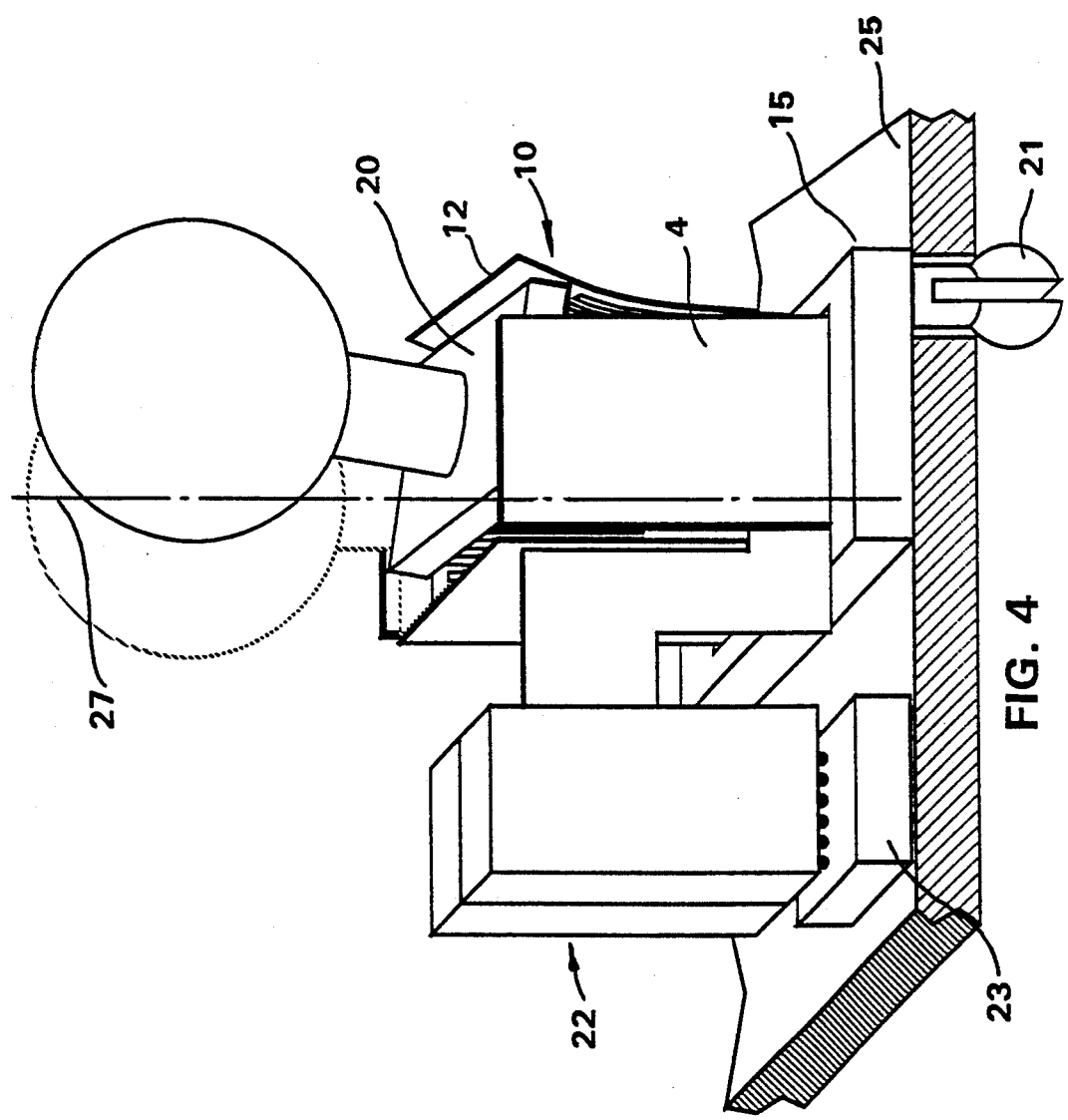
FIG. 4 is a perspective view of an assembled joy stick of the present invention.

To facilitate the forming of the strain gauge structure 10 into its final configuration, portions of the support structure 4 and the base layer 3 are removed by etching, stamping, grinding, etc., from those areas 8 requiring folds or flexibility. The strain gauge structure is then folded along the removed areas 8 forming a square tubular shape as shown in FIG. 4. The strain gauge structure 10 is folded such that the strain gauges 1 are on the inside surface of the tube with the support structure 4 on the outside of the tube, and the connector 5 extending to one side of the strain gauge structure 10. By placing the strain gauges on the inside surface of the tube, the strain gauges are placed in tension upon actuation of the joy stick to deform the top of one or more strain gauge panels outwardly as shown by the solid lines in FIG. 4.

As described above, the strain gauge assembly is capable of measuring strain in all directions in an X-Y coordinate system and can be quickly, efficiently, and cheaply manufactured as a single homogenous circuit including the connector circuit elements 5 for connecting the circuitry to a printed circuit board 25 or to terminals of a terminal block 23 on a printed circuit board. The connector circuit elements 5 may be part of a laminated spring connector 22 for connecting a flexible circuit having a row of printed contact areas 6 to a printed circuit board. Such a connector, as shown by U.S. Pat. No. 4,740,867, is capable of connecting a flexible circuit having a row of printed contact areas 6 to a PC board having a corresponding row of terminal posts (e.g. of a terminal block 23). Such a connector employs a row of post-receiving passages arranged to receive the posts of the PC board. An edge margin of the flexible circuit is clamped between the housing side walls so that the contact areas thereon are aligned with the passages in the housing bottom wall and a set of springs (e.g. springs 24 formed in the support structure 4) positioned inside the housing flexes the circuit edge margin so that, when the connector housing is impaled on the printed PC board posts, the posts project into the housing and are resiliently engaged by corresponding ones of the flexible circuit conductive areas.

Alternatively, connector circuit elements 5 may be part of a self-aligning high-density printed circuit connector for electrically conductive contact with pads on a printed circuit board. Such a connector comprises a housing with a resilient flexible circuit assembly (including connector 6) captively housed therein. The assembly is permitted a limited desired float, so that the areas 6 are self aligning with and are resiliently urged into electrically conductive contact with the pads when the connector is attached at a desired location to the circuit.

Figure 3:
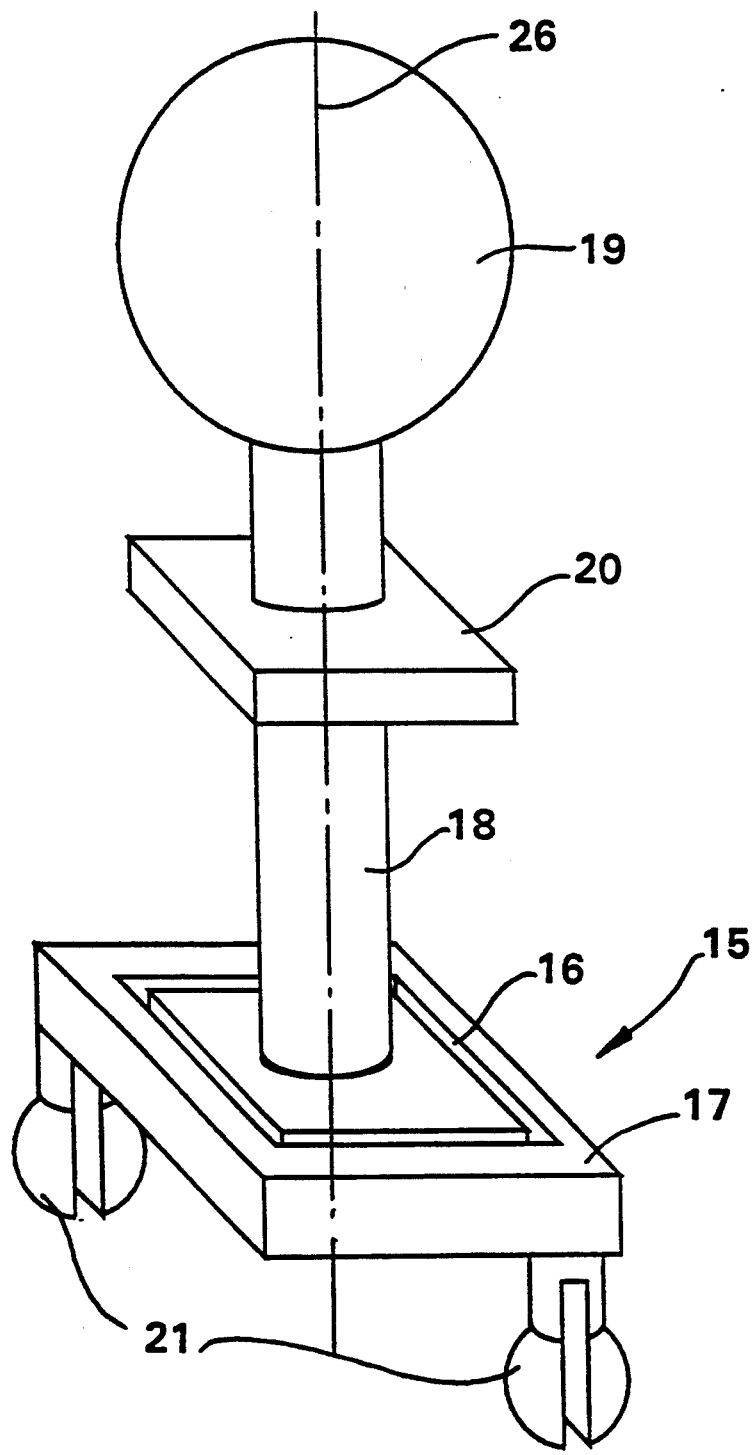
FIG. 3 is a perspective view of the base portion and a joy stick of the present invention.

A molded base, generally indicated as 15 in FIG. 3, has a generally square base portion 17 having a groove 16 molded therein. The groove 16 is shaped to receive the lower edge 11 of the support structure 4 therein. A joy stick 18 is firmly attached to and extends upwards from the center of the base portion 17. A strain gauge actuator 20 is located on the joy stick 18 and a joy stick ball 19 is threadably attached to the top of the joy stick 18. The strain gauge actuator 20 is spaced from the base portion 17 and the joy stick is flexible enough to allow flexure of the joy stick, such that when the strain gauge structure is received in groove 16, the strain gauge actuator 20 contacts the inside of the strain gauge assembly adjacent the top edge 12 of the strain gauge assembly, thereby deflecting the strain gauge assembly upon actuation of the joy stick by a user, as shown by the solid lines in FIG. 4. The dashed lines in FIG. 4 show the joy stick in a neutral position in which the actuator 20 is in contact with all four cantilevers.

The lower edge region of the support structure 4 may be provided with locking projections or openings to cooperate with appropriate features associated with the groove 16 to self-lock the strain gauge assembly in the groove 16 upon insertion therein.

The support structure 4 extends beyond the top and the bottom of the base substrate 3, as best shown in FIG. 1. With this configuration, the strain gauge actuator contacts the support structure 4, not the relatively delicate strain gauges, and only the support structure 4 is received in slot 16 as shown in FIG. 4. In this way, the relatively delicate circuitry is protected from being damaged by the actuator 20 or base member 15. A joy stick ball 19 is threadably attached to the top of the joy stick 18.

The base 15 is locked in place on a printed circuit board 25 using locking tabs, adhesive, ultrasonic or heat fusing techniques, etc. In this embodiment, locking tabs 21 that releasably and securely attach the base member 15 to the printed circuit board 25 are integrally molded onto the base as shown in FIGS. 3 and 4. The base member 15 is molded with the groove 16 and locking tabs 21 as a single integral unit. Joy stick 18, which defines an axis 26, including the strain gauge actuator 20, may be separately molded and later firmly attached to the base portion 17 by adhesive, ultrasonic welding, threads etc., or the joy stick may be integrally molded as a part of the base member 15. The joy stick ball 19 is formed with a diameter that is larger than the cross-section of strain gauge assembly. Therefore, the joy stick ball 19 may be separately formed and threadably attached to the joy stick 18 after attaching the strain gauge assembly 10 to the base member 15 as described below. The joy stick ball 19 is threadably attached to the joy stick 18 so it can be removed, enabling disassembly of the whole assembly.

After attaching the joy stick 18 to the base member 15, the strain gauge structure (defining a longitudinal axis 27) is slid over the strain gauge actuator until the lower edge 11 of the support structure 4 is received in the groove 16. In this configuration, the base member 17 and groove 16 receive, align, and stabilize the support structure 4 of the strain gauge structure 10. Finally, after attaching the strain gauge structure to the base member, the joy stick ball is attached to the end of the joy stick.

The removed portions 8 of the support structure 4 and the base substrate 3 are formed such that they form slots, that are open at the top edge 12 of the strain gauge assembly and closed at the bottom edge 11 of the strain gauge assembly. The support structure thus extends out of the groove 16 in the base as four cantilevers. The strain gauge actuator 20 thereby contacts the support structures 4 at a location that corresponds to the ends of the cantilevers. The cantilever design offers high levels of sensitivity and design flexibility. The spring material 4 being first laminated to the base substrate 3 and then configured with removed areas 8 ensures adhesion consistency and flatness between the strain gauge base substrate 3 and the spring support material 4.

In a variation of this construction the slots are formed between interconnecting closed ends including top edge 12 and the actuator 20 engages the strain gauge assembly intermediate the edges 11 and 12 with the strain gauges are disposed on the outside of the assembly to thereby be placed in tension for effective operation when the actuator bows the walls of the assembly outwardly.

By forming the strain gauges 1, the interconnecting circuitry 2, and the connector circuit elements 5 as a single homogenous assembly, the instant invention greatly improves the reliability of the strain gauge assembly by eliminating attached hardware, such as crimped, welded or soldered-on contacts that are typically used to interconnect the strain gauge to its final system. In the instant invention, the strain gauges are part of, and integral with the final system. Therefore, there is no need to incur the expense of individually attaching the strain gauges to the final assembly. Furthermore, by backing the strain gauge substrate 3 with a spring material support structure 4, designed to accommodate the specific needs of each application, the deflection characteristics of the strain gauge assembly is known with great accuracy and the measurements can be made with high precision.

In a specific example the base substrate 3 is formed of polyimide having a thickness of 0.0005 inches, the spring support structure is formed of beryllium copper having a thickness of 0.005 inches and the strain gauges are formed of Constantan having a thickness of 0.0001 inches. The conducting areas of the circuit assembly, e.g. the interconnecting circuitry 2 and the connector elements 5, are formed by overplating with a highly conductive material such as tin, gold, copper etc. The connector circuit elements 5 are incorporated in a DCC-Post connector 22 as disclosed in U.S. Pat. No. 4,740,867. The DCC connector 22 allows a direct attachment of the assembly to a standard pin block 23 on a printed circuit board. Dashed lines 9 indicate an optional area of the dielectric base substrate 3 for the attachment of any additional components that may be desired to modify the operation of the strain gauge circuit and the dashed lines 28 represent an extension of the support structure 4 to support the components in this area.

The strain gauge construction of the present invention may also be designed to measure shearing and positional strain by simply modifying the circuit design and proper selection of supporting material.

The strain gauge construction of the present invention may also provide a rigid pin like termination that supports the very thin and extremely flexible Constantan. This support structure allows creation of pins that may be inserted into female sockets or soldered directly into a printed circuit board, avoiding the need to attach (solder, crimp or weld) pins.

The present invention also allows active and passive components to be attached to the interconnect circuit and tested as part of the normal manufacturing process. This approach significantly reduces the cost of handling and testing individual strain gauge assemblies.

I claim:

1. A self-terminating printed circuit structure suitable for a joy stick assembly to measure the magnitude and direction, normal to a longitudinal axis of the structure, of a force applied transversely of said longitudinal axis, said printed circuit structure comprising:
   a) a flexible dielectric substrate having opposed first and second major surfaces;
   b) a plurality of strain gauge forming circuit patterns disposed on the first major surface, said dielectric substrate defining a tubular structure defining said longitudinal axis and said strain gauge forming circuit patterns being disposed on said tubular structure parallel to and about said longitudinal axis for deformation by said force to provide said measure of magnitude and direction;
   c) electrically conductive circuit elements forming circuit patterns disposed on the first major surface overlying at least portions of the strain gauge circuit patterns and in electrically conductive continuity therewith;
   d) connector circuit means disposed on the first major surface integral with the circuit elements for terminating the structure at an electrical connector; and
   e) a resilient support means adhered to the second major surface and at least coextensive with said plurality of strain gauge forming circuit patterns.

2. A structure according to claim 1, wherein said support means is formed to define a plurality of cantilever springs, and each cantilever spring is associated with one of said plurality of strain gauge forming circuit patterns.

3. A structure according to claim 2, wherein said strain gauge forming circuit patterns define substantially identical similarly oriented strain gauges, the cantilever springs are identical and each cantilever spring is similarly positioned relative to the associated strain gauges and the strain gauges are actuated by deflection of the associated cantilever spring.

4. A structure according to claim 3, wherein there are four strain gauges, and a cross section of said tubular structure taken along said longitudinal axis is a square.

5. A structure according to claim 3, wherein said strain gauges are similarly oriented and equally spaced with said strain gauges on interior surfaces of the tubular structure, the cross section of the tubular structure normal to said longitudinal axis is a polygon, corners of said polygon being formed at sections of the printed circuit structure that separate said strain gauges from one another.

6. A structure according to claim 5, wherein there are four strain gauges, and a cross section of said tubular structure taken along said longitudinal axis is a square.

7. A structure according to claim 6, in combination with a base and a strain gauge actuator to provide a device having an output representative of the magnitude and direction of strain applied to said strain gauges in said X-Y coordinate system.

8. A structure according to claim 7, wherein the square end of said tubular structure defined by the integral interconnection is rigidly disposed in and fast with a supporting groove in the base, the actuator defines an axis and is firmly disposed in and fast with an opening in the base, the opening being shaped and positioned so that the actuator's axis and the longitudinal axis are coincident, and the actuator includes a strain gauge activating means intimately engaging the tubular structure adjacent the free ends of the cantilever springs, the actuator being resiliently moveable in the X-Y coordinate system to actuate said strain gauges and has means facilitating the application of force to cause said actuation.

9. A structure according to claim 8, wherein said cantilever springs extend longitudinally along said tubular structure beyond the boundaries of said strain gauges.

10. A structure according to claim 9, wherein the combination is a joy stick.

11. A structure according to claim 1, wherein said connector circuit means defines a connector contact array for use in the electrical connector to make electrical contact with a contact arrangement of a structure to which, in use, the connector is mounted.

12. A structure according to claim 1, wherein said connector circuit means defines a connector contact array for use in the electrical connector to make electrical contact with a contact arrangement of a structure to which, in use, said connector circuit means is mounted, the contact array being resiliently supported by a portion of a resilient support means independent from the resilient support mean coextensive with said strain gauge forming circuit patterns, to provide a flexible circuit which interconnects the contact array with said strain gauge forming circuit patterns.

13. A structure according to claim 11, comprising an electrical connector incorporating the contact array.

14. A structure according to claim 2, wherein said strain gauge forming circuit patterns define substantially identical similarly oriented string gauges with identical slots therebetween, each said slot similarly positioned relative to the associated strain gauges and the strain gauges are actuated by deflection of said strain gauges between the slots.

15. A structure according to claim 14, wherein there are four strain gauges and the strain gauges are similarly aligned and equally spaced side by side and the structure is formed into a symmetrical square tubular structure, said tubular structure having corners formed between the strain gauges at the location of the slots.

16. A structure according to claim 15, in combination with a base and a strain gauge actuator to provide an output representative of the magnitude and direction of strain applied to the strain gauges in said X-Y coordinate system, wherein the square end of the tubular structure defined by the integral interconnector is rigidly disposed in and fast with a supporting groove in the base, the actuator defines an axis and is firmly disposed in and fast with an opening in the base, the opening being shaped and positioned so that the actuator's axis and the longitudinal axis are coincident and the actuator includes a strain gauge activating means intimately engaging the tubular structure, the actuator being resiliently moveable in the X-Y coordinate system to actuate the strain gauges and has means facilitating the application of force to cause said actuation.

17. A structure according to claim 1 wherein the circuit elements define a component mounting area supported by the resilient support means.

18. A method of making a printed circuit structure suitable for use in a joy stick assembly capable of measuring the magnitude and direction of a force applied to the joy stick assembly in an X-Y coordinate system, the printed circuit structure comprising a flexible dielectric substrate having opposed first and second major surfaces; a plurality of strain gauge forming circuit patterns disposed on the first major surface; electrically conductive circuit elements disposed on the first major surface overlying portions of the strain gauge forming circuit patterns and in electrically conductive continuity therewith; a connector circuit means disposed on the first major surface integral with the circuit elements for terminating the structure at an electrical connector; and a resilient support means adhered to the second major surface at least coextensive with each circuit pattern; comprising the steps of:
a) laminating the flexible substrate and the resilient support means to one another;
b) forming the strain gauge forming circuit patterns on the first major surface,
c) forming the electrically conductive circuit elements and connector circuit means including overplating to form the overlying portions;
d) removing unwanted portions of the resilient support means; and
e) folding said printed circuit structure to define a tubular structure having a longitudinal axis perpendicular to said X-Y coordinate system and each said strain gauge forming circuit pattern is disposed on a side of said tubular structure and is substantially parallel to said longitudinal axis.

19. A method according to claim 18, comprising forming the circuit elements into a connector contact array, and wherein the removal of unwanted portions forms a resilient support for the contact array.

20. A method according to claim 19, further comprising the steps of supporting the tube fixedly in a base member; and providing an actuator to actuate the strain gauges to provide an indication of direction and magnitude of applied force in said X-Y coordinate system, wherein the removal of unwanted portions forms interconnected cantilever springs each resiliently support one of said strain gauge forming circuit patterns for deflection to actuate the strain gauges.

* * * * *